United States Patent Office 3,210,380
Patented Oct. 5, 1965

3,210,380
PROCESS FOR THE DIRECT EPOXIDATION OF OLEFINS WITH MOLECULAR OXYGEN
Dexter B. Sharp, Creve Coeur, and Stanley L. Reid, St. Louis, Mo., assignors to Monsanto Company, a corporation of Delaware
No Drawing. Filed June 29, 1962, Ser. No. 206,146
7 Claims. (Cl. 260—348.5)

This invention relates to a new and improved process for the direct epoxidation of olefins to olefin oxides using molecular oxygen.

Olefin oxides are valuable articles of commerce, particularly ethylene oxide and propylene oxide. These olefin oxides are prepared by two methods, ethylene oxide by vapor phase oxidation over heterogeneous silver catalysts, and propylene oxide by chlorohydrination followed by elimination of hydrochloric acid to give the oxirane ring system. These two processes, namely the vapor phase process for ethylene oxide, and the chlorohydrin route for propylene oxide, constitute principal means for preparing these two important epoxides. A third method involves the use of peracetic acid in epoxidation of olefins. This latter process has not achieved the commercial importance of the first two processes mentioned.

Nevertheless, each of these aforementioned processes have inherent disadvantages. The vapor phase catalytic oxidation of ethylene to ethylene oxide requires large volume equipment and the handling of tremendous quantities of mixtures of ethylene and oxygen which might become potentially explosive. The second process, that is, the chlorohydrin route for propylene oxide, essentially involves a two-step process and chlorinated compounds are by-products. The third process, involving peracetic acid oxidation of olefins, is potentially hazardous if relatively large quantities of peracetic acid are to be used. It is noted, however, that the peracetic acid process is probably the most versatile of the three methods; it is applicable to a far greater range of olefin structures than are the vapor phase catalytic or the chlorohydrin processes.

There are scattered references to still a fourth method of preparing olefin oxides, namely the liquid phase oxidation of olefins with molecular oxygen. Several of these references disclose procedures which are restrictive in the sense that specific limitations are incorporated in each method. For example, catalysts or other additives or secondary treatment of the oxidation mixtures with basic materials are essential features of these methods.

It is an object of this invention to provide a new and improved liquid phase direct epoxidation process for the preparation of olefin oxides.

It is a further object of this invention to provide a liquid phase direct epoxidation of olefins to olefin oxides which does not require added catalysts, other additives, or secondary treatments with alkaline materials to remove acidic components.

It is a further object of this invention to provide a new class of solvents for direct epoxidation of olefins.

It is an additional object of this invention to provide a new process which is applicable to a wide range of olefin structures; that is, it is not limited to a single olefin, but rather has broad application over a large class of unsaturated compounds.

It is an additional object of this invention to provide a new process which requires relatively small scale equipment and does not involve the hazards associated with certain of the prior art processes, e.g., the vapor phase process.

Still more particularly, this invention relates to a process for the direct epoxidation of olefins with molecular oxygen in a solvent comprising aliphatic, alicyclic or aromatic nitriles.

Since the present invention is concerned with a novel liquid phase epoxidation system the discussion below will be directed to typical existing schemes for liquid phase olefin oxidations. These prior art processes describe different approaches designed to establish, in a given instance, a proper balance of a series of reactant compositions and/or reaction variables as necessary conditions in order to obtain the desired olefin oxide. For example, various specific oxidation catalysts or catalyst solvent systems have been described (U.S. Patents 2,741,623, 2,837,424, 2,974,161 and 2,985,668); another approach is the incorporation of oxidation anticatalysts which retard certain undesirable side reactions (U.S. Patent 2,279,470); still another approach emphasizes the use of water-immiscribe hydrocarbon solvents alone, or in the presence of saturated hydrocarbons (U.S. Patent 2,780,634) or polymerization inhibitors such as nitrobenzene (U.S. Patent 2,780,635); another method describes the use of neutralizers such as alkali metal and alkaline earth metal hydroxides, or salts of these metals (U.S. Patent 2,838,524); another approach involves the use of certain catalysts in an alkaline liquid phase (U.S. Patent 2,366,724), or a liquid phase maintained within a specified critical pH range (U.S. Patent 2,650,927); and still other approaches emphasize criticality of oxygen pressure (U.S. Patent 2,879,276), or the geometry of the reaction zone (U.S. Patents 2,530,509 and 2,977,374). The foregoing represent prior art approaches to problems encountered in the utilization of a liquid phase oxidation process to obtain olefin oxides.

It is the primary object of the instant invention to provide a superior process for commercial production of olefin oxides by direct epoxidation of olefins with molecular oxygen, which process is free of numerous limitations recited in prior art processes.

A further object of this invention is to provide a liquid phase process for the production of olefin oxides which is not dependent upon the presence or absence of any catalyst nor dependent upon the presence of water-immiscible solvents or upon solvents containing added buffers or acid neutralizers; nor is it dependent upon the presence of saturated compounds, initiators or anticatalysts; further it is not dependent upon critical reactor geometries, temperatures, pressures, pH level, oxygen concentration, flow rates, or reactant ratios.

Other objects of this invention are to provide a process for production of olefin oxides in batch or continuous manner by a one-step method which is simple, safe, economical and dependable.

These and other objects of the invention will become apparent to those skilled in the art as the description of the invention herein proceeds.

According to the present invention, it has been discovered that olefins can be oxidized to epoxides with molecular oxygen in high conversions and yields when the oxidation is allowed to proceed in a liquid reaction medium comprising saturated aliphatic, alicyclic or aromatic nitriles or mixtures thereof. These nitriles may be monoor polyfunctional insofar as the nitrile group is concerned.

Aliphatic nitriles suitable herein contain, broadly, from 1 to 18 carbon atoms in the non-nitrilic portion of the molecule. These nitriles include both straight-chain and branched-chain nitriles. However, best results are obtained with straight-chain nitriles containing from 1 to 8 carbon atoms in the non-nitrilic moiety.

Among the alicyclic and aromatic nitriles, those having up to 6 carbon atoms in the ring are most suitable, and these nitriles may further be substituted with alkyl groups containing from 1 to 6 carbon atoms.

The nitrile solvents in the present invention are suitable when used individually or in admixture with other nitriles. For example, acetonitrile mixed in varying proportions with propionitrile, or dinitriles such as malononitrile and succinonitrile are suitable herein.

Representative saturated aliphatic nitriles containing a single nitrile group include straight-chain nitriles such as acetonitrile, propionitrile, butyronitrile, valeronitrile, capronitrile, oenanthonitrile, caprylonitrile, pelargononitrile, undecanonitrile, myristonitrile, palmitonitrile, stearonitrile. Likewise suitable are branched-chain nitriles such isobutyronitrile, isovaleronitrile, 3-methylheptanonitrile, 4-methyldecanonitrile, 5-methyltetradecanonitrile and 5-methylpentadecanonitrile. Aliphatic dinitriles which are useful as reaction media for this oxidation include malononitrile, succinonitrile, glutaronitrile, adiponitrile, 1,10-decanodinitrile, 1,14-tetradecanodinitrile and 1,18-octadecanodinitrile. Representative branched-chain aliphatic dinitriles include 2-methylmalononitrile, 2,3-dimethylsuccinonitrile, 2,5 - dimethyladiponitrile, 4-methyl-1,7-heptanodinitrile and 2,9-dimethyl-1,10-decanodinitrile.

Representative alicyclic mononitriles include cyclopentanecarbonitrile and cyclohexanecarbonitrile. Dinitriles in the alicyclic class include 1,2-cyclopentanedicarbonitrile and 1,2-cyclohexanedicarbonitrile.

Representative aromatic nitriles include benzonitrile, phthalonitrile, o- and p-toluunitrile and phenylacetonitrile.

Of particular interest in the instant invention are the saturated aliphatic nitriles and dinitriles. Still more particularly, of greatest interest is acetonitrile.

The solvents contemplated in the present disclosure combine essential characteristics and features required for successful solution or liquid phase oxidation, that is, they are essentially chemically indifferent and are oxidatively and thermally stable. Furthermore, the instant solvents are superior to those disclosed in prior art liquid phase olefin oxidation processes in that these nitriles do not require buffers, neutralizers, initiators, inhibitors and/or catalysts in order to effect oxidation of the olefin with molecular oxygen to the olefin oxide in high yield and conversion. The solvents of prior art processes variously require buffers and neutralizers to remove acids, initiators and catalysts to promote the oxidation, and inhibitors or anticatalysts to retard side-reactions.

It is known that olefin oxidations give, in addition to epoxides, various by-products such as water, formic acid and acetic acid. These by-products may be deleterious to the oxidation when present in appreciable quantities, for example, reaction of water with the olefin oxide to give correspondingly glycol, and reaction of acids with olefin oxide to give glycol ester derivatives as well as undesired polymeric materials. Prior art methods have used a variety of approaches to counteract these deleterious effects, such as the use of water-immiscible hydrocarbon solvents containing inhibitors or utilized in conjunction with a separate washing step with solutions of basic substances. The latter process, for example, requires acid removal in a separate step in order to render such hydrocarbon solvents suitable for use in olefin oxidation without loss of epoxide by action of accumulated acidic products.

It is a primary feature of the instant invention that the nitrile solvents contemplated herein need no added substances to counteract the deleterious effects of water and/ or acids. Furthermore, the preferred nitriles disclosed herein as solvents for the oxidation are not water-immiscible, hence, avoid the problems engendered with a two phase reaction system arising from the use of water-immiscible solvents for an oxidation which produces water as by-product. Moreover, by use of these nitriles surprisingly substantial concentrations of water and organic acids can be tolerated without undue adverse effects upon the course of the olefin epoxidation or retention of epoxide as such.

It is a further feature of the instant invention that the olefin oxidations proceed at such a rapid rate that the oxygen is quantitatively consumed, hence, accumulations of potentially hazardous explosive mixtures of oxygen and organic materials in the vapor state are avoided.

It is further apparent that there is no criticality insofar as pH value is concerned for this oxidation when carried out in the contemplated nitrile solvents since appreciable concentrations of acid by-products, for example, up to 20 weight percent of acetic acid, are not particularly deleterious. Hence, the olefin oxidation proceeds equally as well over a range of acidities represented by a pH as low as pH 4 as well as in neutral and alkaline pH ranges.

The superiority of the instant nitrile solvents is further exemplified by the resistance to chemical attack possessed by the nitrile group. Substantial evidence exists that these olefin oxidations, for example, propylene to propylene oxide by direct oxidation with molecular oxygen, are propagated by a free radical chain mechanism. Copper and its compounds are strong inhibitors for this propylene oxidation, an inhibition possibly due to a redox reaction of copper with peroxy radicals which interrupts the chain propagation sequence and prevents attainment of a long kinetic chain necessary for reasonable conversion of the olefin. In addition, when free radical inhibitors, that is, antioxidants, are added to the reaction mixture, partial or total repression of the olefin oxidation occurs. In the absence of such inhibitors a very rapid, vigorous, exothermic oxidation of the olefin occurs in the nitrile solvents. Furthermore, the nitrile solvents are apparently very resistant to free radical attack and are recovered substantially unchanged. On the contrary, among prior art solvents benzene is an example of a compound which is readily attacked by free radicals in some instances giving phenyl radicals. Phenyl radicals can react with oxygen to give phenolic or quinonoid-type molecules which are known to be efficient inhibitors for free radical chain oxidations. Thus, when benzene is used as a solvent for an olefin oxidation this susceptibility to free radical attack apparently accounts for an effect which might be termed auto-inhibition, that is, the rate of oxidation of the olefin decreases rapidly with time. In comparison, the instant nitrile solvents, which have a high order of resistance to radical attack, do not impede the radical chain sequence and the rate of oxidation of the olefin is not affected; the olefin oxidation proceeds to the depletion of either the olefin or the oxygen.

The nitrile solvents disclosed in the instant invention constitute a suitable reaction medium for substantially all olefins or substantially all olefin oxidations with molecular oxygen to form olefin oxides. The term "molecular oxygen" as used herein includes pure or impure oxygen as well as gases containing free oxygen, for example, air.

Olefins suitable for use herein preferably include those of the ethylenic and cycloethylenic series up to 18 carbon atoms per molecule, e.g., ethylene, propylene, butenes, pentenes, hexenes, heptenes, octenes, nonenes, dodecenes, pentadecenes, heptadecenes, octadecenes, cyclobutenes, cyclopentenes, cyclohexenes, cyclooctenes, etc. Of particular interest, utility and convenience are the olefins containing from 2 to 8 carbon atoms. Included are alkyl-substituted olefins such as 2-methyl-1-butene, 2-methyl-2-butene, 2-methylpropene, 4-methyl-2-pentene, 2-ethyl - 3 - methyl-1-butene, 2,3-dimethyl-2-butene and 2-methyl-2-pentene. Other suitable olefinic compounds include butadiene, isoprene and other pentadienes, hexadienes, heptadienes, octadienes, decadienes, octadecadienes, cyclopentenes, cyclohexenes, alkyl- and polyalkylcyclopentenes, alkyl- and polyalkylcyclohexenes, aryl-substituted cycloalkenes and cycloalkadienes, vinyl-substituted cycloalkenes and benzenes, cyclopentadiene, dicyclopentadiene, styrene, methylstyrene, alkylmethylstyrene, and other vinyl-substituted aromatic systems. Another class of olefinically unsaturated compounds which are of interest in this direct epoxidation to epoxides are the unsaturated macromolecules, that is, the rubbers, such as butadiene polymers, isoprene polymers, butadiene-styrene copolymers, isobutyleneisoprene copolymers, chloroprene polymers and other copolymers incorporating dienic and vinyl comonomers therein, and the like.

Particularly suitable olefin feed stocks contemplated in the instant invention include the pure olefin, mixtures thereof or olefin stocks containing as much as 50% of saturated compounds. Olefinic feed materials include those formed by cracking petroleum stock such as hydrocarbon oils, paraffin wax, lubricating oil stocks, gas oils, kerosenes, naphthas and the like.

The reaction temperatures used in liquid phase olefin oxidations using the solvents of the instant invention are subject only to a lower limit below which the oxidation either proceeds too slowly or follows a course other than that leading to olefin oxides. The upper limit of the temperature range is that which may be termed a threshold above which substantial decomposition, polymerization or excessive oxidative side reactions occur, thereby leading to undesirable side reactions and products which substantially detract from the yield of the olefin oxide. In general, temperatures of the order of 50° C.–400° C. are contemplated. It is expedient to maintain temperatures at a sufficiently high level to insure thermal decomposition of hazardous peroxides which may be formed and accumulated to the point of unsafe operation. Within this general temperature range preferred temperatures are within the range of 150°–250° C.

Subatmospheric, atmospheric or superatmospheric pressures are suitable for use in the instant invention, that is, ranging from 0.2 to 350 atmospheres. Usually the oxidation reaction is facilitated by the use of higher pressures, hence a preferred pressure range is from 5 to 200 atmospheres. Pressures herein delineated and temperatures described previously will generally be selected, of course, depending upon the characteristics of the individual olefin which is to be oxidized to the olefin oxide, but this combination of temperatures and pressures will be such as to maintain a liquid phase. Olefin oxidations in the instant nitrile solvents are autocatalytic, that is, they are free radical chain reactions which proceed very rapidly after a brief induction period and give remarkably constant product composition over wide variations of conditions. A typical olefin oxidation, for example, propylene in batch operation, requires from about 1 to 20 minutes. Similar, or faster, reaction rates occur in continuous operation. The reaction vessel for conducting this olefin oxidation can be made of materials which may include almost any kind of ceramic material, porcelain, glass, silica, various metals, such as stainless steels, aluminum, silver and nickel, which vessels do not necessarily have to comply to any particular geometric design. It should be noted in the instant invention, no added catalysts are necessary and no reliance is placed upon catalytic activity of the walls of the reactor or reactor components.

Various means known to the art can be utilized for establishing intimate contact of the reactants, i.e., olefin and molecular oxygen in the solvent, for example, by stirring, sparging, shaking, vibration, spraying or various other types of agitation in the reaction mixture. The vigorous agitation of the reaction mixture effects not only intimate contact of olefin and oxygen but also facilitates removal of the heat of reaction to suitably oriented heat exchangers. It is to be noted also, that the exothermic nature of the olefin oxidation is such that very small or negligible amounts of heat need be applied to the reaction system in order to maintain the desired temperature of operation, hence, reaction temperature is adequately maintained by suitable design and proper use of heat exchange components.

As noted above, no added catalysts are required in the present invention. The usual oxidation catalysts can be tolerated although usually no significant benefit accrues from their use because the olefin oxidations proceed in such facile manner in the nitrile solvents of the instant invention. Oxidation catalysts such as platinum, selenium, vanadium, manganese, silver, cobalt, cadmium and mercury in metallic or compound form, preferably as oxide or carbonate or as soluble acetates or carboxylates may be present singly or mixed, in gross form supported or unsupported, or as finely-divided suspensions or in solution in the nitrile solvent.

It should also be noted that since olefin oxidations according to this invention proceed at such a rapid rate after a brief induction period, no initiators, accelerators, or promoters are required, but these may be used to shorten or eliminate the brief induction period after which no additional initiator, promoter or accelerator need be added. Suitable initiators, accelerators or promoters include organic peroxides such as benzoyl peroxide, tertiary-butyl hydroperoxide, di-tertiary-butyl peroxide, inorganic peroxides such as hydrogen and sodium peroxides, organic peracids such as peracetic and perbenzoic acid or various other peroxidic derivatives such as the hydroperoxide addition products of ketones and aldehydes. Also useful as initiators, promoters or accelerators for the purpose of reducing the time of the induction period, but following which induction period no more need be added, are readily-oxidizable materials such as aldehydes, e.g., acetaldehyde, propionaldehyde, isobutyraldehyde and the like and ethers such as diethyl ether, diisopropyl ether, and the like.

The reaction mixtures to be used in carrying out the process of the instant invention may be made up in a variety of ways. Exemplary combinations are the olefin and/or oxygen premixed with a solvent, or the olefin premixed with the solvent, suitably up to 45% by weight and, preferably, from 5 to 30% by weight of the solvent, and the oxygen added thereto. The oxygen-containing gas may be introduced into the olefin solvent mixture incrementally or continuously. Or, the reactor may be charged with solvent and the olefin and oxygen gas may be introduced simultaneously through separate feed lines into the body of the solvent in a suitable reaction vessel. In one embodiment the olefin and oxygen-containing gas mixture is introduced into the solvent in a continuously stirred reactor, under the conditions of temperatures and pressures selected for this particular olefin. Suitable olefin to oxygen volumetric ratios are within the range of 1 to 5 up to 15 to 1. Feed rates, generally, of oxygen or oxygen-containing gas may vary from 0.5 to 1500 cubic feet per hour or higher and will largely depend upon reactor size within production quantity desired. The oxygen input is adjusted in such manner as to allow virtually complete usage of oxygen, thereby keeping the oxygen concentration in the off-gas above the reaction mixture below about 1%. Obviously this safeguard is necessary in order to prevent a hazardous concentration of explosive gases, as is well known in the art. Proper adjustment of feed rates is of importance in order that the olefin not be stripped from the liquid phase, thus reducing its concentration, hence reducing the rate of oxidation of the olefin which would result in lower conversions per unit time of olefin to olefin oxide. The nitrile solvents used herein represent the predominant constituent in the reaction mixture, with respect to all other constituents, including reactants, oxidation products and by-products. By predominant is meant enough solvent is always present to exceed the combined weight of all other constituents. In other words, the reaction mixture comprises major amounts of the nitrile solvent and minor amounts of all other constituents with respect thereto.

The oxidation products are removed from the reactor as a combined liquid and gaseous effluent containing the olefin oxide, unreacted components and by-products, by properly adjusting conditions of temperature and pressure and by adjustment of a let-down system, or the entire reaction mixture containing the oxidation products is removed from the reactor; conventional techniques for separation of desired product including distillation, fractionation, extraction, crystallizations and the like, are employed to effect separation of the desired olefin oxide. One procedure comprises continually removing the liquid effluent from the reaction zone to a distillation column and removing various fractions of products contained therein, in effect, a fractionation to obtain the olefin oxide. From such suitable fractionation process nitrile solvent is recovered and this nitrile is recycled to the reaction zone.

The invention will be more fully understood by reference to the illustrative specific embodiments presented below.

A modified cylindrical, Hoke, high-pressure vessel is employed for the batch-type oxidations described below. A high pressure fitting was welded to the vessel near one end to serve as gas inlet, and a block valve with rupture disc was attached to this fitting with a one-quarter inch high pressure tubing "goose-neck." A thermocouple was sealed into one end opening of the vessel. The solvent and initiator (if any employed) are then charged through the other end opening which is then sealed with the plug. The olefin is then charged to the desired amount, as determined by weight difference, that is, the olefin, if normally gaseous, is charged under pressure and, if normally liquid, may be charged into one of the end-openings along with solvent, and the charged vessel is affixed to a bracket attached to a motor-driven eccentric which provides vertical vibrational agitation. The tubular Hoke vessel is clamped in a horizontal position in order that maximum agitation of contents ensues. This vibrating reaction vessel can be immersed in a hot bath for heating to reaction temperatures and removed, then immersed in a cold bath to quench to room temperature.

In Examples 1–4 are shown (1) an experimental comparison between a typical prior art solvent, benzene, containing an oxidation catalyst, silver benzoate, and a typical solvent of the instant invention, acetonitrile, when tested under like conditions as an olefin oxidation solvent (Examples 1 and 2); (2) the apparent adverse effect on epoxide yield in the present oxidation system of a concentrated amount of an inert gas, nitrogen, which is commonly used in prior art processes (compare Example 1 with Examples 3 and 4); and (3) that acetaldehyde added as an initiator has no effect on epoxide yield (compare Examples 3 and 4).

*Example 1*

To a 150 ml. Hoke pressure reaction vessel was charged 20.48 g. of acetonitrile, 7.61 g. of propylene and 100 p.s.i.g. pressure of nitrogen was added to the system. The closed bomb was mounted on the agitator assembly of the oxidation apparatus and immersed in a hot polyethylene glycol bath maintained at a temperature of 200° C. When temperature equilibrium was reached the autogenous pressure within the reaction vessel was 725 p.s.i.g. Oxygen was introduced to the vessel to give a 200 p.s.i.g. overpressure above the autogenous pressure whereupon the internal pressure began to fall after about 2 minutes indicating that oxidation had started. Oxygen was repressured as needed to maintain 275–300 p.s.i.g. oxygen partial pressure and the oxidation was allowed to proceed for 15 minutes. The pressure reaction vessel with oxygen turned off, was immersed in a cold water bath, closed and removed from the analyses. Vapor phase chromatographic analyses were carried out on the gas and liquid phases, and indicated 80% conversion of propylene to oxygenated products, among which propylene oxide was obtained in 18% yield, and acetone was obtained in 6% yield.

*Example 2*

This example illustrates the superiority of acetonitrile over benzene, a typical prior art solvent, as an olefin oxidation medium, the latter solvent even containing a silver benzoate oxidation catalyst. To a 150-ml. pressure reaction vessel was charged 20.36 g. of benzene, 46 mg. of silver benzoate, and 12.85 g. of propylene. To this vessel was charged 100 p.s.i.g. of nitrogen. The vessel was attached to the agitator assembly of the oxidation apparatus and immersed in a 200° C. polythylene glycol bath, whereupon an autogenous pressure of 800 p.s.i.g. was developed. When temperature equilibrium had been reached, 200 p.s.i.g. oxygen overpressure was added to the pressure reaction vessel, but in this case a noticeable pressure drop occurred only after 6 minutes after which a 275–300 p.s.i.g. oxygen partial pressure was maintained in the pressure reaction vessel. The oxidation was allowed to proceed for 15 minutes, then the oxygen was turned off and the vessel was immersed in a cold water bath. The vessel was removed and the gaseous and liquid phases were analyzed by vapor phase chromatographic means. These analyses indicated a 39% conversion of propylene to oxygenated products, among which propylene oxide was obtained in 6.5% yield and acetone was obtained in 1% yield. Thus, in spite of the presence of the catalytic material, silver benzoate, benzene, a common solvent for propylene oxidation disclosed in the prior art, is decidedly inferior to acetonitrile as a solvent for this direct epoxidation reaction.

*Example 3*

To a 150 ml. pressure reaction vessel was charged 20.08 g. of acetonitrile, and 6.67 g. of propylene. The sealed vessel was attached to the agitator assembly of the oxidation apparatus and immersed in a hot polyethylene glycol bath maintained at a temperature of 200° C., whereup an autogenous pressure of 450 p.s.i.g. was developed. Oxygen was admitted to the vessel to give a partial pressure of 170 p.s.i.g., whereupon the oxidation commenced shortly after this introduction as indicated by temperature surge within the reactor. The oxidation was allowed to proceed until the rate of oxidation had decreased, whereupon the oxygen was turned off and the pressure reaction vessel was immersed in a cold water bath, removed from the apparatus, and the gaseous and liquid phases were analyzed by vapor phase chromatography. These analyses indicated that 41.4% of the propylene was converted to oxygenated products, among which propylene oxide was obtained in 34% yield and acetone was obtained in 3.6% yield.

*Example 4*

To a 150 ml. Hoke reaction vessel was charged 20.24 g. of acetonitrile, 0.20 g. of acetaldehyde, and 7.22 g. of propylene. The sealed vessel was attached to the agitator assembly of the oxidation apparatus and immersed in a hot polyethylene glycol bath maintained at 200° C., whereupon an autogenous pressure of 465 p.s.i.g. was developed. Oxygen was introduced to the vessel to give 135 p.s.i.g. pressure over the autogenous pressure, then at 3 minutes the total pressure was increased to 625 p.s.i.g., and at 7 minutes the pressure was increased to 640 p.s.i.g. The reaction was allowed to proceed for 12 minutes, then oxygen was turned off and the pressure reaction vessel was immersed in a cold water bath. The vessel was removed and the liquid and gaseous phases were analyzed by vapor phase chromatography. These analyses indicated a 38% conversion of propylene to oxygenated products, among which propylene oxide was obtained in 34% yield and acetone in 3.2% yield.

Example 5

To a Hoke pressure vessel is charged 23 g. of propionitrile, 0.17 g. of acetaldehyde initiator and about 6 g. of ethylene. The sealed vessel is attached to the agitator assembly and immersed in a bath maintained at 200° C., and when thermal equilibrium is reached, oxygen is introduced to give an overpressure of 200 p.s.i.g. above the autogenous pressure developed in the reaction at the reaction temperature. Oxidation begins immediately and is allowed to proceed for about six minutes, after which time the oxygen is shut off and the vessel is immersed in a cold water bath. The vessel is removed and subjected to vapor phase chromatographic analyses which indicate 13.5% conversion of ethylene to oxygenated products, among which ethylene oxide is obtained in about 18.3% yield.

Example 6

To a Hoke pressure vessel is charged 23 g. of succinonitrile, 0.17 g. of acetaldehyde, and about 7.5 g. of 2-methyl-2-butene. The sealed vessel is attached to an agitator assembly and immersed in a polyethylene glycol bath maintained at 160° C. When thermal equilibrium is reached, oxygen is introduced to an overpressure of 100 p.s.i.g. above the autogenous pressure developed in the reaction vessel, whereupon oxidation commences immediately. The oxidation is allowed to proceed for about six minutes, then the oxygen is shut off and the vessel is immersed in a cold water bath and quenched to room temperature. The vessel is then removed and the contents are analyzed by vapor phase chromatography. These analyses show a 68% conversion of 2-methyl-2-butene to oxygenated products among which 2-methyl-2,3-epoxybutane is obtained in about 58% yield and acetone is obtained in about 25% yield.

Example 7

To a pressure reaction vessel as described previously, 23 g. of adiponitrile and about 7 g. of branched dodecene, known to the trade as propylene tetramer or tetrapropylene, is charged along with 0.13 g. of acetaldehyde; the acetaldehyde serves to reduce the brief induction period. The reaction vessel is mounted on a shaking apparatus and immersed in a bath maintained at 150° C. and allowed to equilibrate to the bath temperature. The autogenous pressure developed is approximately 150 p.s.i.g. Pure oxygen is pressured to this vessel to give approximately 100 p.s.i.g. overpressure above the autogenous pressure. The reaction starts immediately and is allowed to proceed for about five minutes, whereupon the oxygen is turned off and the vessel is immersed in a cold water bath. The reaction vessel is removed, the contents are then analyzed by vapor phase chromatographic means whereby it is determined that 65% of the branched dodecene has been converted to oxygenated products, among which epoxydodecane is obtained in approximately 40% yield.

Example 8

To a pressure reaction vessel described previously is charged 24 g. of benzonitrile and about 8 g. of cyclohexene, along with 0.13 g. of acetaldehyde; the aldehyde serves to reduce the induction period. The vessel is mounted on the vibration assembly and lowered into a hot polyethylene glycol bath maintained at a temperature of 160° C. When the vessel has reached equilibrium with the bath temperature oxygen, in the amount of 150 p.s.i.g. above the autogenous pressure developed in the vessel on heat-up, is introduced and the oxidation is allowed to proceed for about 10 minutes. The oxygen is turned off, the vessel is immersed in a cold water bath, and then removed for analyses. Vapor phase chromatographic analyses indicate a 25% conversion of cyclohexene to oxygenated products, among which cyclohexene oxide is obtained in about 21% yield.

Example 9

To a pressure reaction vessel is charged 22 g. of acetonitrile, approximately 7.5 g. of isobutylene and 0.13 g. of acetaldehyde to serve as induction period timer-reducer. This vessel is then immersed in a polyethylene glycol bath maintained at a temperature of 160° C., and when equilibrium temperature is reached, 200 p.s.i.g. overpressure of oxygen is allowed to enter the vessel. The oxidation commences immediately and is allowed to proceed for about five minutes whereupon the oxygen is turned off and the vessel is immersed in the cold water bath. The vessel is opened, the contents are removed and analyzed by vapor phase chromatographic methods, and 30% of the isobutylene charged is found to be converted to oxygenated products, among which is isobutylene oxide obtained in about 35% yield and acetone in about 20% yield.

Example 10

To a previously described pressure reaction vessel is charged 23 g. of acetonitrile, about 6.5 g. of vinylcyclohexene and 0.13 g. of induction period time-reducer acetaldehyde. The vessel is mounted on the agitator apparatus and immersed in a polyethylene glycol bath maintained at a temperature of 170° C. After temperature equilibrium is reached, pure oxygen is introduced into the vessel to the amount of 200 p.s.i.g. above the autogeneous pressure developed during heat-up period. The oxidation commences immediately and is allowed to proceed for about 8 minutes, whereupon the oxygen is turned off and the vessel is quenched in the cold water bath. The vessel is removed, opened and the contents are analyzed by vapor phase chromatographic methods. These analyses show that 26% of the vinylcyclohexene is converted to oxygenated products among which is obtained vinylcyclohexene oxide in approximately 22% yield.

Variations and modifications of the instant invention will occur to those skilled in the art without departing from the spirit and scope thereof.

We claim:

1. Process for the preparation of olefin oxides which comprises oxidizing an epoxidizable olefinically unsaturated hydrocarbon compound having up to 18 carbon atoms, with molecular oxygen at a temperature within the range of from 50° to 400° C. and a pressure within the range of from 0.2 to 350 atmospheres in a liquid reaction medium consisting essentially of a major amount of a material selected from the group consisting of saturated aliphatic, alicyclic and aromatic nitriles and mixtures thereof, said aliphatic nitriles having from 1 to 18 carbon atoms in the non-nitrilic portion of the molecule and said alicyclic and aromatic nitriles having no more than 6 carbon atoms in the ring and having no substituents other than alkyl groups having up to 6 carbon atoms when substituted.

2. Process according to claim 1 wherein said oxidation occurs in the absence of added catalysts.

3. Process according to claim 1 wherein said nitrile is acetonitrile.

4. Process according to claim 1 wherein said liquid reaction medium is a saturated aliphatic dinitrile containing from 1 to 18 carbon atoms in the non-nitrilic portion of the molecule.

5. Process for the preparation of propylene oxide which comprises oxidizing propylene with molecular oxygen at a temperature within the range of from 150° C. to 250° C. and pressures within the range of from 5 to 200 atmospheres in a liquid reaction medium selected from the group consisting of saturated aliphatic, alicyclic and aromatic nitriles, and mixtures thereof, said aliphatic nitriles having from 1 to 18 carbon atoms in the non-nitrilic portion of the molecule and said alicyclic and aromatic nitriles having no more than 6 carbon atoms in the ring, and having no substituents other than alkyl groups up to 6 carbon atoms when substituted.

6. Process according to claim 5 wherein said reaction medium is a saturated aliphatic nitrile containing from 1 to 18 carbon atoms in the non-nitrilic portion of the molecule.

7. Process according to claim 6 wherein said nitrile is acetonitrile.

References Cited by the Examiner

UNITED STATES PATENTS

| | | | |
|---|---|---|---|
| 2,279,469 | 4/42 | Law et al. | 260—348.5 |
| 2,784,202 | 3/57 | Gardner et al. | 260—348.5 |

OTHER REFERENCES

Bergmann: The Chemistry of Acetylene and Related Compounds, page 80, Interscience Publishers Inc., New York (1948).

WALTER A. MODANCE, *Primary Examiner.*

IRVING MARCUS, *Examiner.*